(12) United States Patent
Hwang et al.

(10) Patent No.: US 8,488,595 B2
(45) Date of Patent: Jul. 16, 2013

(54) SYSTEM FOR DIALING FROM INTERNET EXTENSION TO CONVENTIONAL EXTENSION

(75) Inventors: Shaw Hwa Hwang, Taipei (TW); Shun Chieh Chang, Taipei (TW); Kuan Lin Chen, Taipei (TW); Chi Jung Huang, Taipei (TW); Li Te Shen, Taipei (TW); Ben Chen Liu, Taipei (TW); Yu Che Wang, Taipei (TW)

(73) Assignee: National Taipei University of Technology, Taipei (TW)

( * ) Notice: Subject to any disclaimer, the term of this patent is extended or adjusted under 35 U.S.C. 154(b) by 800 days.

(21) Appl. No.: 12/585,905

(22) Filed: Sep. 29, 2009

(65) Prior Publication Data

US 2011/0002326 A1    Jan. 6, 2011

(30) Foreign Application Priority Data

Jul. 1, 2009    (TW) .............................. 98122179 A

(51) Int. Cl.
*H04L 12/66* (2006.01)

(52) U.S. Cl.
USPC ........... 370/352; 370/276; 370/400; 370/384; 370/386; 370/254; 370/426; 370/356; 370/401; 709/220; 709/225; 709/229

(58) Field of Classification Search
USPC .................. 709/220, 225, 229; 370/352, 376, 370/400, 401, 384, 386, 426, 522, 254
See application file for complete search history.

(56) References Cited

U.S. PATENT DOCUMENTS

| | | | |
|---|---|---|---|
| 6,956,848 B1* | 10/2005 | Keung et al. | 370/356 |
| 7,496,672 B2* | 2/2009 | Orton et al. | 709/230 |
| 8,204,183 B2* | 6/2012 | Hwang et al. | 379/88.17 |
| 2007/0070985 A1* | 3/2007 | Huang | 370/352 |
| 2007/0091906 A1* | 4/2007 | Croy et al. | 370/401 |
| 2008/0285547 A1* | 11/2008 | Lee et al. | 370/352 |
| 2009/0279683 A1* | 11/2009 | Gisby et al. | 379/201.02 |
| 2011/0211531 A1* | 9/2011 | Woodson et al. | 370/328 |

* cited by examiner

*Primary Examiner* — Asad Nawaz
*Assistant Examiner* — Khaled Kassim
(74) *Attorney, Agent, or Firm* — Bacon & Thomas, PLLC

(57) ABSTRACT

A system for dialing from Internet extension to conventional extension is disclosed. A VoIP gateway or an IP auto attendant is used for dialing from Internet extension to conventional extension. The phone number of the Private Branch Exchange and the voice guidance are not needed. The calling number of SIP message is interpreted directly and converted into DTMF (Dual-tone multi-frequency) messages for dialing into a conventional extension.

3 Claims, 9 Drawing Sheets

SYSTEM FOR DIALING FROM INTERNET EXTENSION TO CONVENTIONAL EXTENSION

FIELD OF THE INVENTION

The present invention relates to a system for dialing from internet extension to conventional extension, and more particularly to a method system by using a VoIP gateway or an IP auto attendant to interpret SIP messages and convert into DTMF (Dual-tone multi-frequency) signals for being read by a Private Branch Exchange (PBX).

BACKGROUND OF THE INVENTION

VoIP (Voice over Internet Protocol) is one of the popular communication technology. In VoIP, SIP (Session Initiation Protocol) defined by IETF is the most widely used protocol because of its simple structure, expandability and easy operation.

In a conventional telephone system, the number of extensions is limited by the capacity of the Private Branch Exchange. A Private Branch Exchange with more capacity will have a higher price. Therefore it is often to combine an Internet telephone system into a conventional telephone system for increasing the extensions and for upgrading into an IP telephone system so as to provide a more flexible expandability for extensions.

FIG. 1 shows a conventional IP telephone system, which is designed in an elementary school. The Internet telephone system comprises an SIP proxy server 1 and Internet extensions 10. The conventional telephone system comprises a gateway 2 of conventional telephone system, a Private Branch Exchange (PBX) 3, an auto attendants 4 and conventional extensions 30. The SIP proxy server 1 of the Internet telephone system connects with an upper SIP proxy server 6 of Taipei Education Bureau. The gateway 2 of conventional telephone system connects with Chung-Hwa Telecommunication Co. 5. SIP proxy server 1 connects with Internet extensions 10, auto attendants 4, gateway 2 and SIP proxy server 6 by Internet indicated by dotted lines. Chung-Hwa Telecommunication Co. 5, gateway 2, Private Branch Exchange 3, auto attendants 4 and conventional extensions 30 are connected by conventional telephone lines indicated by solid lines, as shown in the figure.

A dialing from an Internet extension 10 to a conventional extension 30 has to dial the telephone number of the Private Branch Exchange 3 first so as to pass through SIP proxy server 1, gateway 2, Private Branch Exchange 3, and then answered by the auto attendants 4 for providing a voice guidance, thereafter dial the number 30 of the conventional extension 30 so that a connection between the Private Branch Exchange 3 and the conventional extension 30 is established, as shown by the bold solid arrow lines in FIG. 1

The dialing described above has to dial the telephone number of the Private Branch Exchange 3 first and then directed by a voice guidance, it is not convenient.

SUMMARY OF THE INVENTION

The object of the present invention is to provide a system in IP telephone system for dialing from an Internet extension to a conventional extension by dialing directly the telephone number of the conventional extension without dialing a telephone number of the Private Branch Exchange and without voice guidance.

The system for dialing from internet extension to conventional extension according to the present invention comprises an SIP proxy server, an Internet extension, a Private Branch Exchange, a VoIP gateway and a conventional extension; the SIP Proxy server, the Internet extension and the VoIP gateway are connected by Internet; the Private Branch Exchange, the VoIP gateway and the conventional extension are connected by conventional telephone lines; when dialing from internet extension to conventional extension, it is not necessary to dial a telephone number of the Private Branch Exchange, just dial directly a telephone number of the conventional extension from the Internet extension, and then pass through the SIP proxy server, the VoIP gateway, the Private Branch Exchange to the conventional extension, no voice guidance is needed.

The VoIP gateway has a telephone port and an Internet port, the telephone port has an FXO interface for being connected with an FXS interface of the Private Branch Exchange; the Internet port connects with the SIP proxy server by Internet.

The VoIP gateway can be replaced by an IP auto attendants. The IP auto attendants is a computer-telephone integration system comprised of a computer, an Network interface controller and a telephone voice card, and an application program is designed for controlling.

DETAILED DESCRIPTIONS OF THE PREFERRED EMBODIMENTS

Introduction to SIP

A message is the basic unit for SIP to set up a speech communication. The message can be classified into "request" message and "response" message. A "request" is an SIP message from a client to a server to express the purpose of the client; while a "response" is an SIP message from a server to a client to answer the request from the client.

SIP request messages used in the present invention are shown in table 1 as below.

TABLE 1

SIP request messages used in the present invention

| requests | descriptions |
| --- | --- |
| INVITE | A client requests setting up a speech communication. |
| BYE | To end up a successful speech communication. A request terminal for INVITE or a receiving terminal can issue such request. |
| ACK | A request that the client (issuing an INVITE) confirms to the server that a final response is received. |
| RING-IN | The server causes the receiving terminal to ring. |
| OFFHOOK | The receving terminal receives the call. |
| Forward | Send out the telephone number. |
| ONHOOK | Hang up the phone. |
| Play DTMF | Convert into DTMF signals |

SIP response messages used in the present invention are shown in table 2 as below.

TABLE 2

SIP response messages used in the present invention

| responses | descriptions |
| --- | --- |
| 100~199 | The server has received a request, and the request is processed. |
| 100 Trying | The server is processing the request from the client. |
| 180 Ringing | The server causes the request terminal to ring. |
| 200~299 | The server accepts the request from the client. |
| 200 OK | "200 OK" from the server means the "INVITE" is accepted, "200 OK" from the request terminal means the "BYE" is accepted, and the speech communication is ended. |

Description of the Flow Chart in Conventional IP Telephone System

Figure 2:
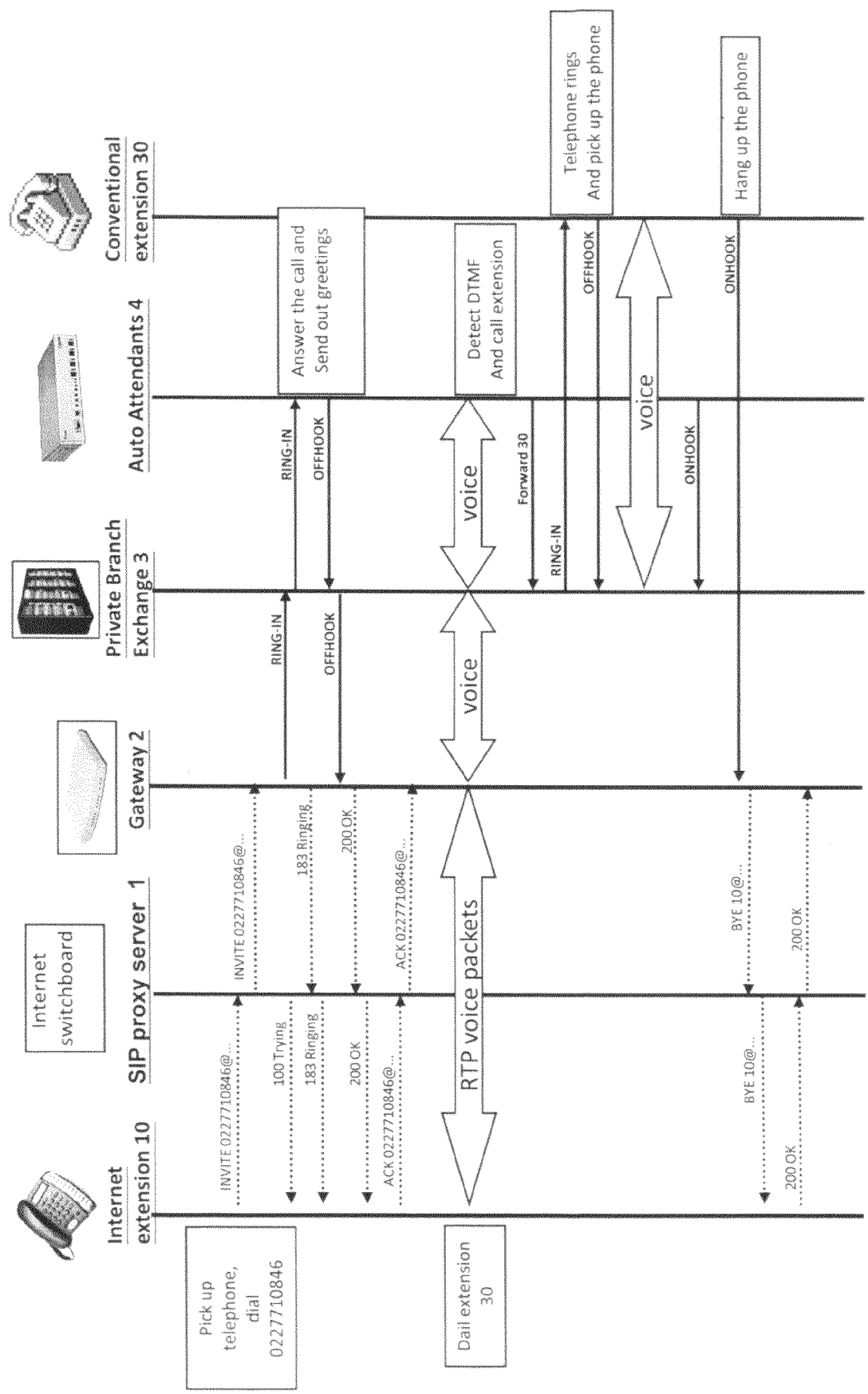
FIG. 2 shows the message flow chart of a conventional IP telephone system for dialing from Internet extension to conventional extension.

Referring to FIG. 2, a user dials the telephone number 0227710846 of the Private Branch Exchange 3 at the Internet extension 10, and issues message INVITE 0227710846@ . . . for passing through the SIP proxy server 1 to the gateway 2; the gateway 2 issues RING-IN message to the Private Branch Exchange 3, then the Private Branch Exchange 3 transfers the RING-IN message to the auto attendants 4; the auto attendants 4 answers the call automatically and sends out greetings, issues OFFHOOK message for passing through the Private Branch Exchange 3 to the gateway 2; and then the gateway 2 issues messages of 183 Ringing and 200 OK to the SIP proxy server 1; the SIP proxy server 1 issues messages of 100 Trying, 183 Ringing and 200 OK to the Internet extension 10; the internet extension 10 returns with ACK 0227710846@ . . . for passing through SIP proxy server 1 to the gateway 2, therefore confirms the dialing.

Thereafter the user dials the telephone number 30 of the conventional extension 30 directly to the auto attendants 4; the auto attendants 4 sends the telephone number 30 of the conventional extension 30 to the Private Branch Exchange 3 by message Forward 30; the Private Branch Exchange 3 issues RING-IN message to the conventional extension 30 and causes the conventional extension 30 to ring, then offhooked by someone and issuing OFFHOOK message to the Private Branch Exchange 3; and then a speech communication is conducted; the auto attendants 4 also issues ONHOOK message to the Private Branch Exchange 3 to end up the voice guidance. Once the conventional extension 30 hangs up the phone, the conventional extension 30 issues ONHOOK message to the gateway 2; the gateway 2 issues BYE 10@ . . . for passing through SIP proxy server 1 to the Internet extension 10, then the Internet extension 10 issues 200 OK message to the gateway 2 to end up the communication.

Description of the IP Telephone System of the Present Invention

The present invention is limited in the function for dialing from internet extension to conventional extension.

Figure 3:
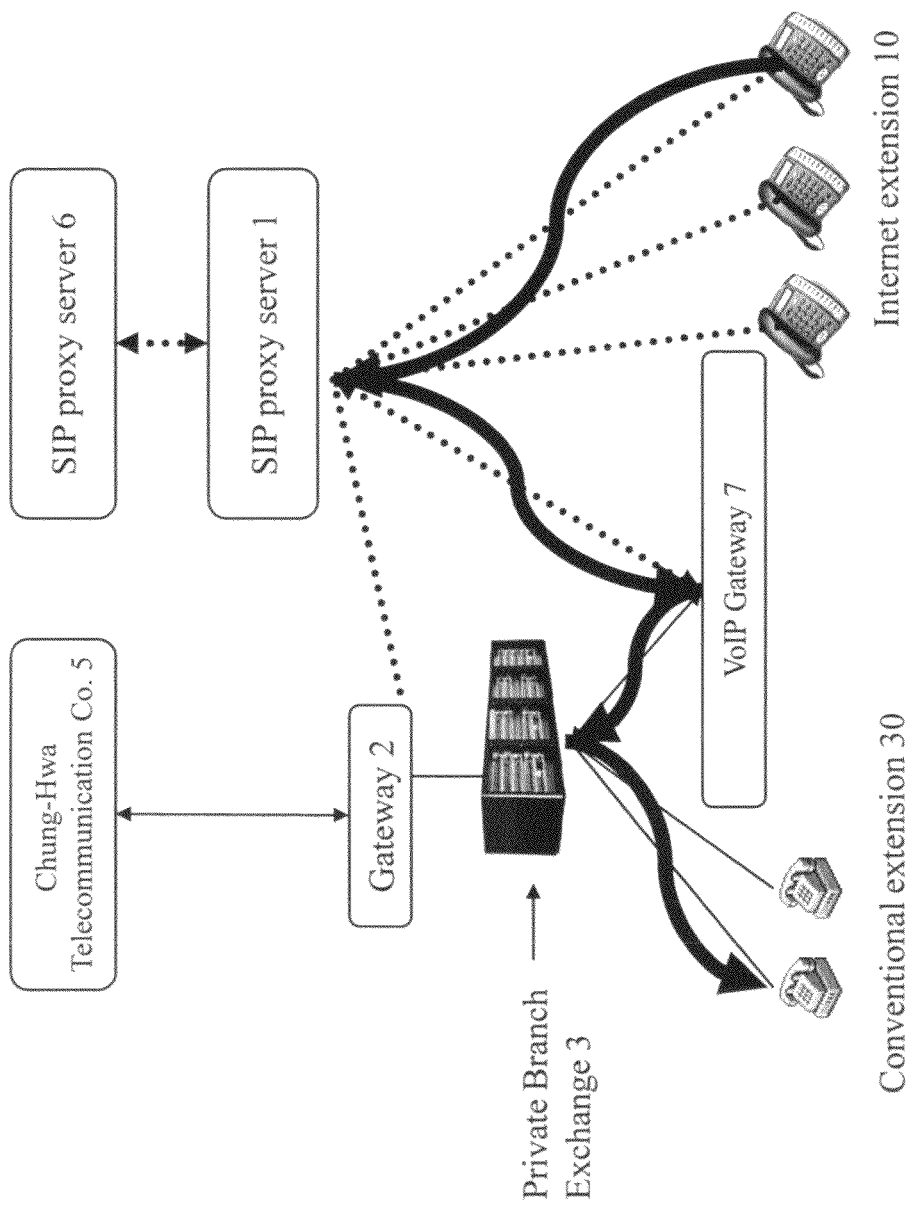
FIG. 3 shows schematically the improvement of the IP telephone system for dialing from Internet extension to conventional extension according to the present invention.

Referring to FIG. 3, which shows the system diagram of the present invention, including an SIP proxy server 1, Internet extensions 10 for Internet telephone; a gateway 2, a Private Branch Exchange 3, conventional extensions 30 for conventional telephone; and VoIP gateway 7. The SIP proxy server 1 of the Internet telephone connects with an upper SIP proxy server 6 of Taipei Education Bureau. The gateway 2 of the conventional telephone connects with Chung-Hwa Telecommunication Co. 5. The SIP proxy server 1 connects with the Internet extensions 30, the VoIP gateway 7, the gateway 2 and the SIP proxy server 6 by Internet indicated by dotted lines. The Chung-Hwa Telecommunication Co. 5, the gateway 2, the Private Branch Exchange 3, the VoIP gateway 7 and the conventional extensions 30 are connected by conventional telephone lines indicated by solid lines, as shown in the figure.

Figure 1:
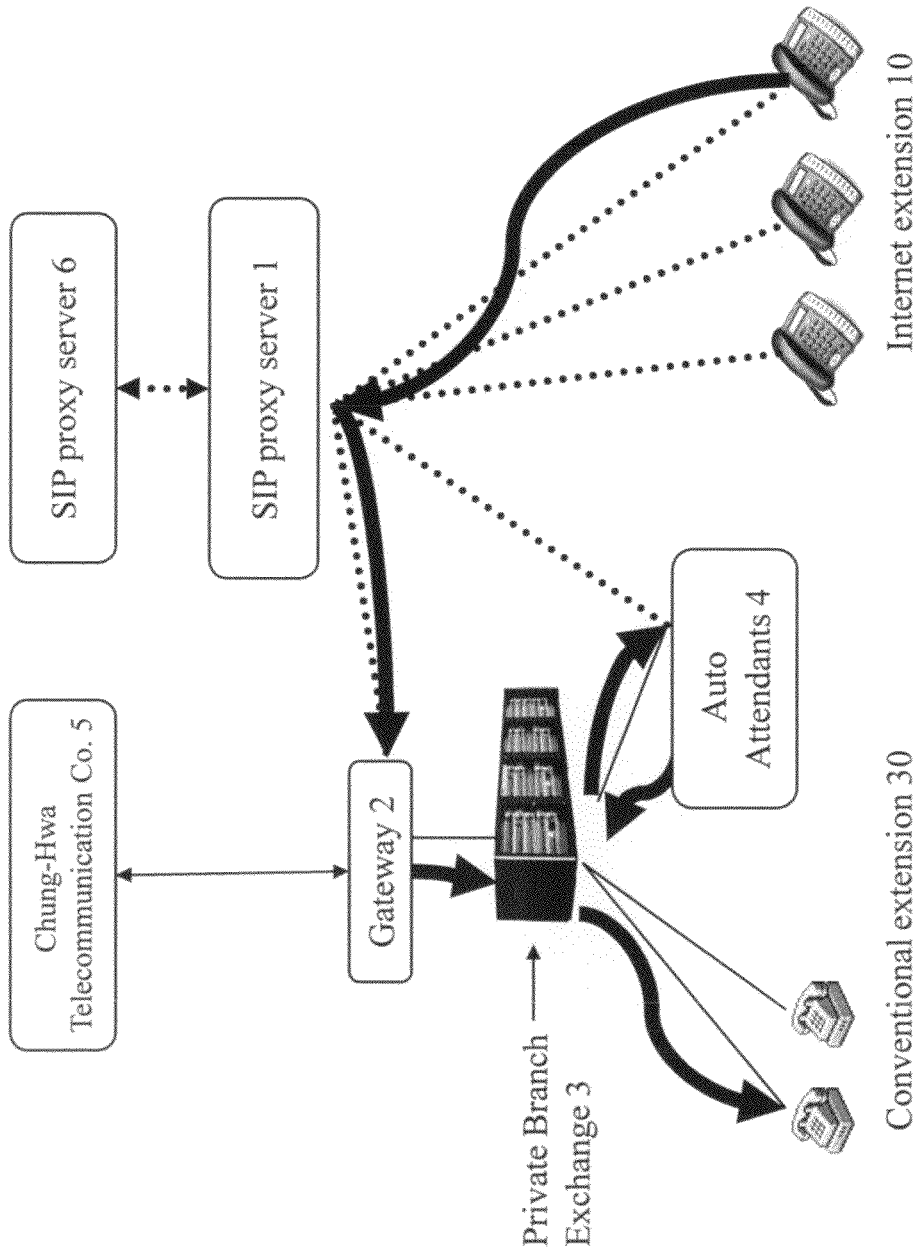
FIG. 1 shows schematically the diagram of a conventional IP telephone system for dialing from Internet extension conventional extension.

A dialing from the Internet extension 10 to the conventional extension 30 will pass through the SIP proxy server 1, the VoIP gateway 7, the Private Branch Exchange 3 directly to the conventional extension 30, as shown by the bold solid arrow lines in FIG. 3. FIG. 3 is different from FIG. 1 in that it is not necessary to go through the gateway 2 and there is no voice guidance in FIG. 3, a user can dial the number 30 of the conventional extension 30 directly at the Internet extension 10, it is not necessary to dial the telephone number of the Private Branch Exchange 3.

Figure 4:
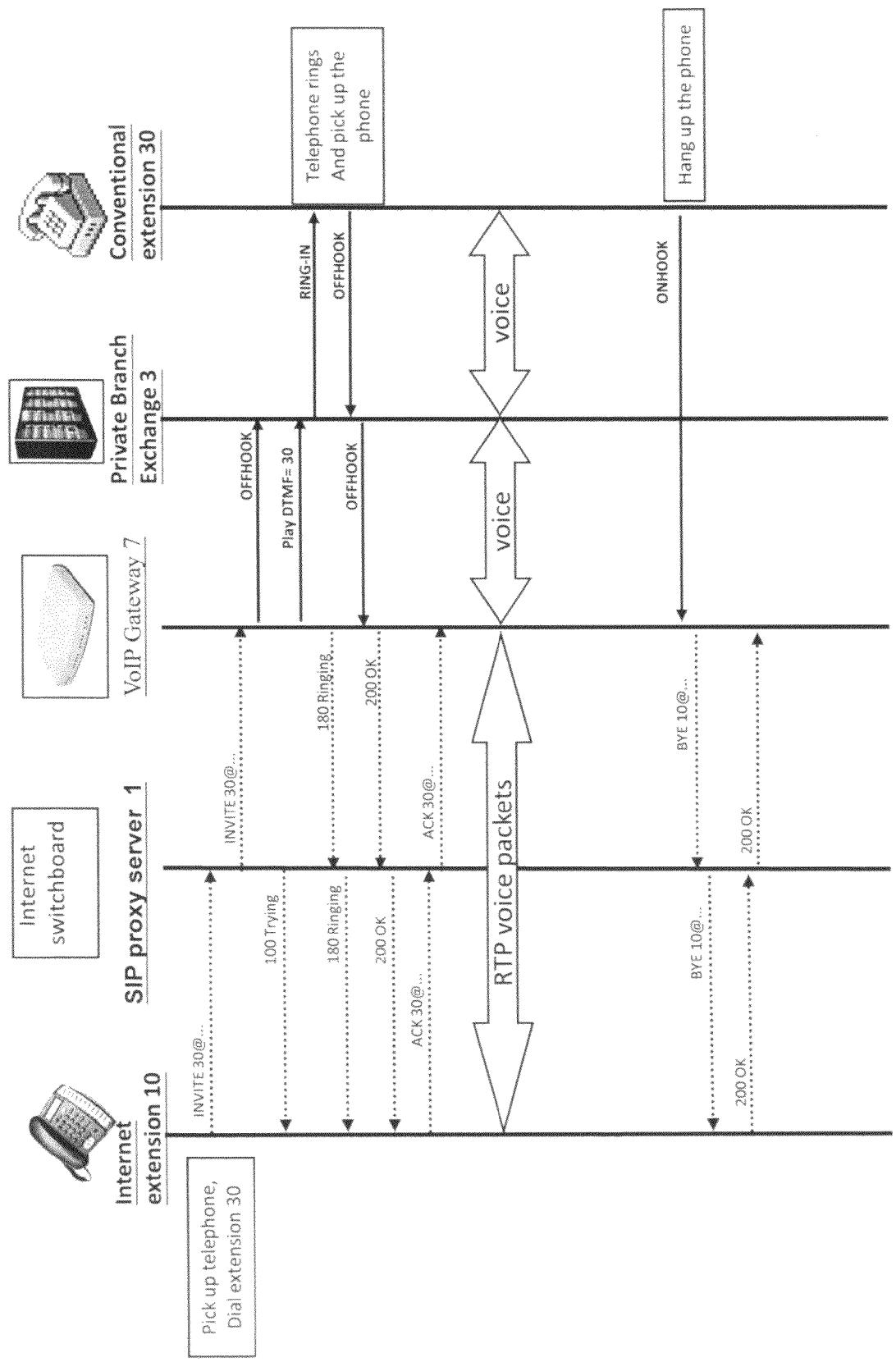
FIG. 4 shows the message flow chart of the IP telephone system for dialing from Internet extension to conventional extension according to the present invention.

Referring to FIG. 4, a flow chart in IP telephone system of the present invention is described. A user picks up the telephone at the Internet extension 10 for dialing the telephone number 30 of the conventional extension 30, a message Invite 30@ . . . is issued for passing through the SIP proxy server 1 to the VoIP gateway 7, and then the VoIP gateway 7 issues OFFHOOK message and Play DTMF=30 message to the Private Branch Exchange 3; thereafter the Private Branch Exchange 3 issues RING-IN message and causes the conventional extension 30 to ring; the conventional extension 30 was offhooked by someone so as to issue OFFHOOK message for passing through the Private Branch Exchange 3 to the VoIP gateway 7; and then the VoIP gateway 7 issues 180 Ringing and 200 OK messages for passing through the SIP proxy server 1 to the Internet extension 10; the SIP proxy server will issue 100 Trying message simultaneously to the Internet extension 10; the Internet extension 10 will return with a message ACK 30@ . . . for passing through the SIP proxy server 1 to the VoIP gateway 7, means the communication is conducted, so the Internet extension 10 and the conventional extension 30 passes RTP (Real-time Transport Protocol) speech packets and voice with each other, as shown in the figure. After the communication is ended, the conventional extension 30 hangs up the telephone, a message ONHOOK is issued to the VoIP gateway 7; the VoIP gateway 7 will then issue Bye 10@ . . . message for passing through the SIP proxy server 1 to the conventional extension 10; the conventional extension 10 returns with 200 OK message for passing through the SIP proxy server 1 to the VoIP gateway 7, so the communication is ended.

Description of the Function of the VoIP Gateway 7

The VoIP gateway 7 is a device between conventional PSTN telephone and IP Internet. It has an Internet port and a telephone port, RJ-45 port is usually used for the Internet port, while RJ-11 port is used for the telephone port. RJ-11 port has two specifications of FXS (Foreign exchange station) and FXO (Foreign exchange office). The present invention uses the Tenor AS Series gateway of QUINTUM, which has both the FXS and FXO specifications.

If the VoIP gateway 7 is to connect with FXO port of the Private Branch Exchange 3, then an FXS gateway has to be used; if the VoIP gateway 7 is to connect with FXS port of the Private Branch Exchange 3, then an FXO gateway has to be used. The present invention uses a VoIP gateway 7 having FXO port for being connected with FXS port of the Private Branch Exchange 3.

The present invention is limited in the function for dialing from internet extension to conventional extension.

The VoIP gateway 7 has to set up parameters at the beginning as below:
 a. close up the FXS port;
 b. set up an account number of Internet telephone for being registered in the SIP proxy server;
 c. set up a route from the Internet port to the FXO port so that the SIP message entered from the Internet port can be converted into SS7 (Signaling System No. 7) message to be sent out through the telephone port.

When the Internet extension 10 dials the conventional extension 30, for message part (SIP and SS7 messages): the Internet extension 10 sends the Internet telephone messages for passing through the SIP proxy server 1 to the Internet port of the VoIP gateway 7, and then the VoIP gateway 7 analyzes the dialing number for passing through the telephone port to the Private Branch Exchange 3 and then to the conventional extension 30; on the contrary, the conventional extension 30 returns with the conventional telephone message for passing through the telephone port, and then being converted into a corresponding Internet telephone message for sending to the Internet extension 10. For voice part: the voice packets received from the Internet port by the VoIP gateway 7 will be converted into voice signals for sending out through the telephone port; on the contrary, the voice signals received from the telephone port will be converted into voice packets for sending out through the Internet port.

Figure 5:
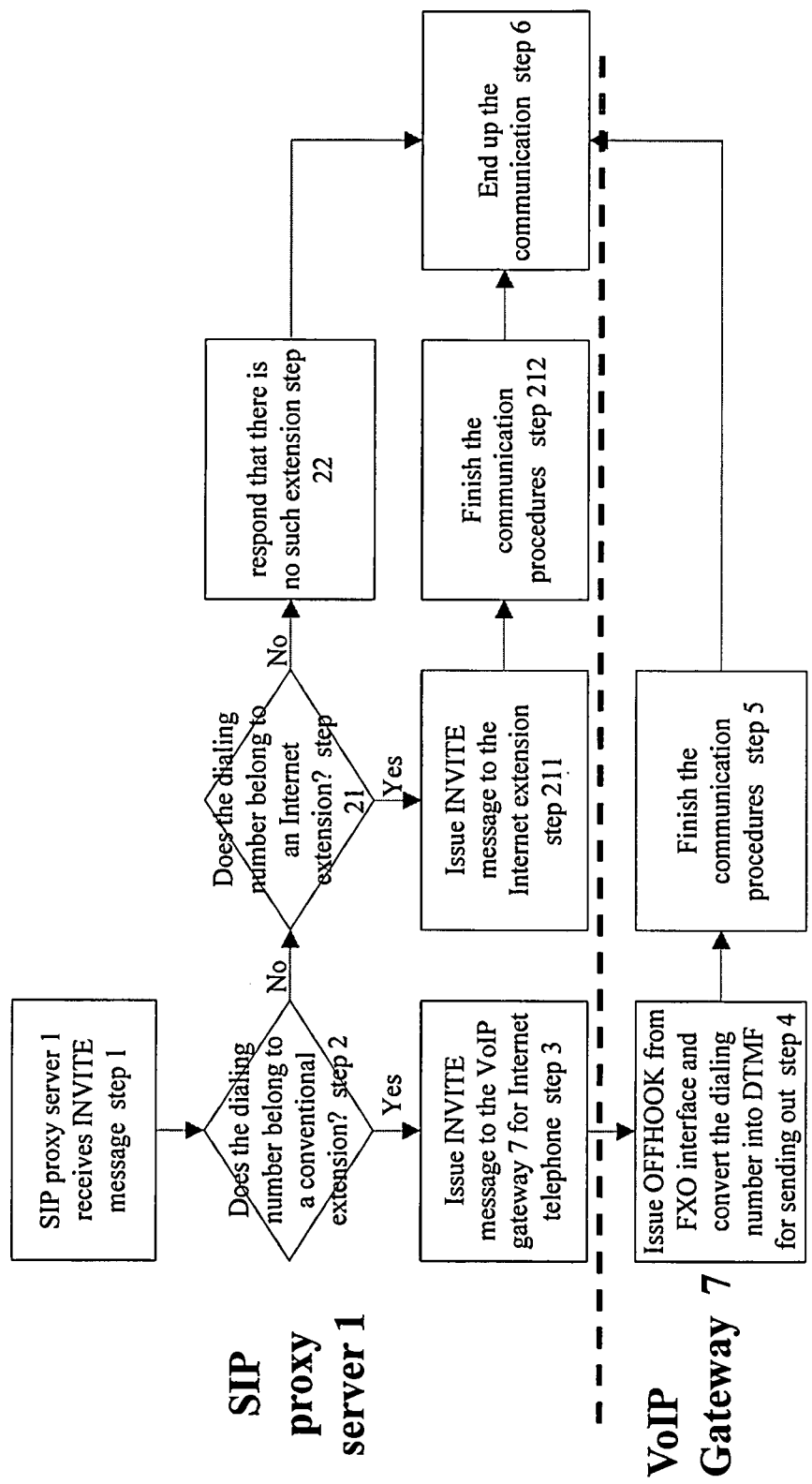
FIG. 5 is the functional flow chart between the SIP proxy server and the VoIP gateway with FXO interface according to the present invention.

Referring to FIG. 5, which is the functional flow chart between the SIP proxy server 1 and the VoIP gateway 7 with FXO interface. When the SIP proxy server 1 receives INVITE message issued from the Internet extension 10 (step 1); the dialing number is analyzed to see if it belongs to a conventional extension (step 2); if the dialing number does not belong to a conventional extension, then it is analyzed to see if it belongs to an Internet extension (step 21), if yes, then the SIP proxy server 1 issues the INVITE message to the Internet extension (step 211), and finishes ringing, offhook, communication, onhook procedures (step 212), and then ends up the communication (step 6); if the dialing number is not a number of an Internet extension, then the SIP proxy server 1 responds that there is no such extension (step 22), and ends up the communication (step 6).

If the dialing number is a conventional extension number, then the SIP proxy server 1 will issue INVITE message to the VoIP gateway 7 (step 3). When the VoIP gateway 7 receives the message from the Internet port, an OFFHOOK message will be issued through the telephone port, and then the dialing number will be converted into DTMF signals for sending out through the telephone port (step 4), thereafter finish ringing, offhook, communication, onhook procedures (step 5), and then end up the communication (step 6).

Description of the IP Auto Attendants

The VoIP gateway 7 can be replaced by an IP auto attendants. IP auto attendants is a computer-telephone integration system (CTI) comprised of a computer, an network interface controller and a telephone voice card (EVS (Electronic Voice Services) Dialogic D/4PCI-UFW). The telephone voice card is an interface card used for processing the voice on the telephone, having functions of OFFHOOK, ONHOOK, DTMF, Busy Tone, Disconnected Tone, Flash, etc. The IP auto attendants connects to the Internet through the network interface controller for sending or receiving Internet packets, including SIP messages and RTP voice packets of VoIP. The IP auto attendants connects to the conventional telephone network (PSTN) through the telephone voice card for detecting or issuing SS7 (Signaling System No. 7) messages and voice signals. An application program can be designed for the IP auto attendants to control the API (Application Programming Interface) of the network interface controller and the telephone voice card so as to achieve integration function for the Internet and telephone.

Figure 6:
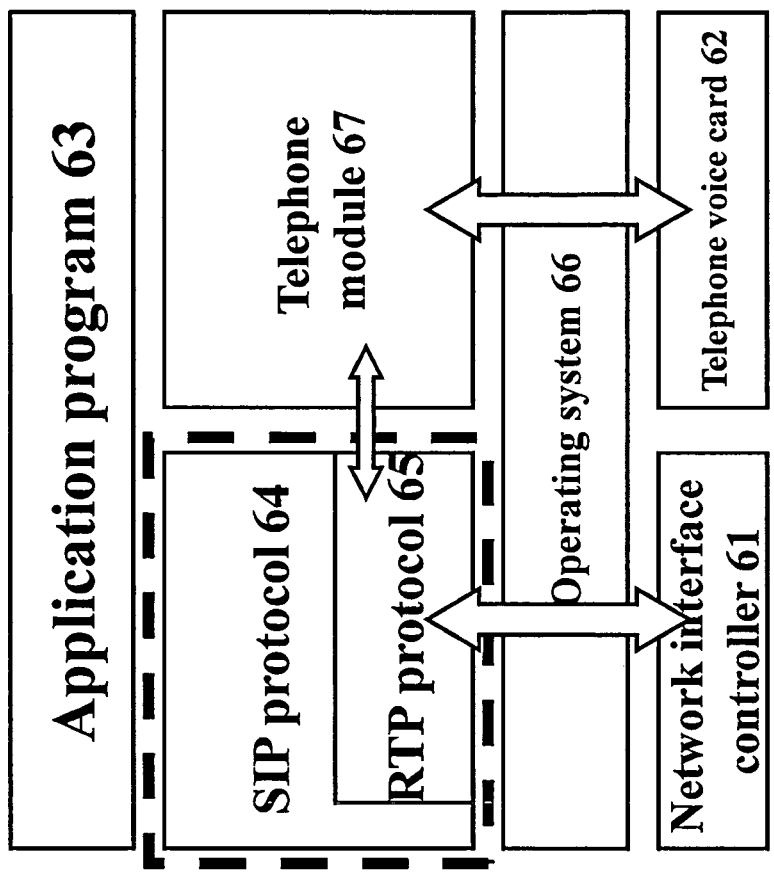
FIG. 6 shows schematically the block diagrams of the IP auto attendants having both functions of the Internet telephone and the conventional telephone according to the present invention.

As to the function design thereof, as shown in FIG. 6, the IP auto attendants has to have an network interface controller 61 and a telephone voice card 62, and an application program 63 is designed for controlling the network interface controller 61 and the telephone voice card 62. The message between Internet and telephone used in the present invention is SIP (Session Initiation Protocol) 64, the voice transmission used in the present invention is RTP (Real-time Transport Protocol) 65. The Internet packets are transmitted and received through an operating system 66 by the network interface controller 61; the telephone module 67 uses the API provided by the telephone voice card 62 through the operating system 66 to control messages and voice of the telephone voice card 62

The IP auto attendants has the function to process Internet telephone and conventional telephone, so it can provide four aspects for communication: 1. dialing between the Internet extensions, 2. dialing between the conventional telephones, 3. dialing from Internet extension to conventional extension, 4. dialing from conventional extension to Internet extension.

The present invention only adopts the third aspect of dialing from Internet extension to conventional extension. When an Internet extension 10 dials a conventional extension 30, for message part: IP auto attendants receives Internet telephone messages sent from the Internet extension 10 through the SIP proxy server 1 by the network interface controller 61, analyzes the dialing number from the Internet packets, and then sends message by the telephone voice card 62 to the Private Branch Exchange 3; on the contrary, when the telephone voice card 62 receives conventional telephone messages returned from the conventional extension 30, the conventional telephone messages will be converted into corresponding Internet telephone messages and sent to the Internet extension 10 by the network interface controller 61. For voice part: voice packets received from the network interface controller 61 by IP auto attendants will be converted into voice signals for transmission through the telephone voice card 62, while the voice signals received from the telephone voice card 62 will be converted into voice packets for transmission through the network interface controller 61.

Figure 7:
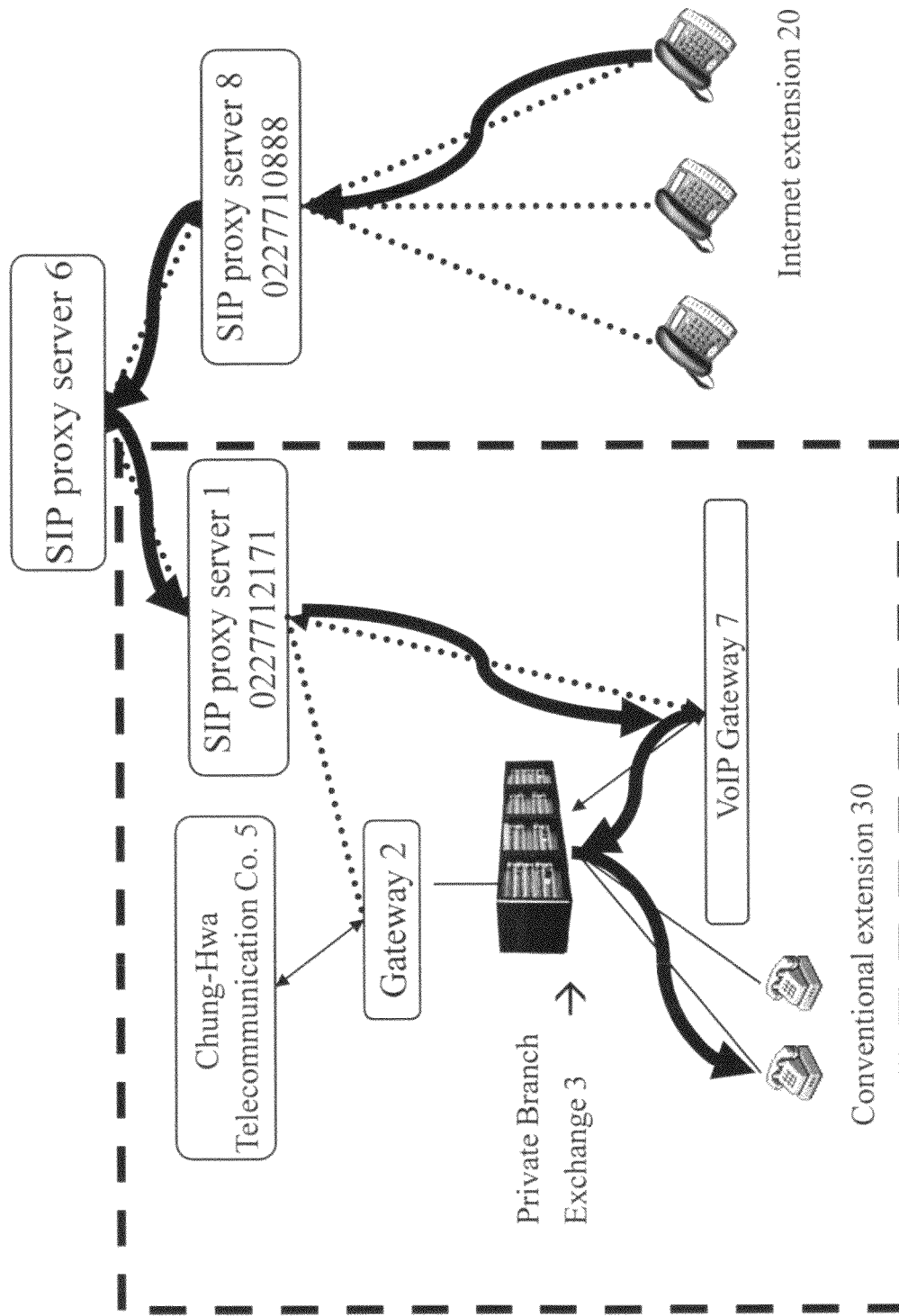
FIG. 7 is the system diagram for dialing from Internet extension of other SIP proxy server to conventional extension.
Figure 8:
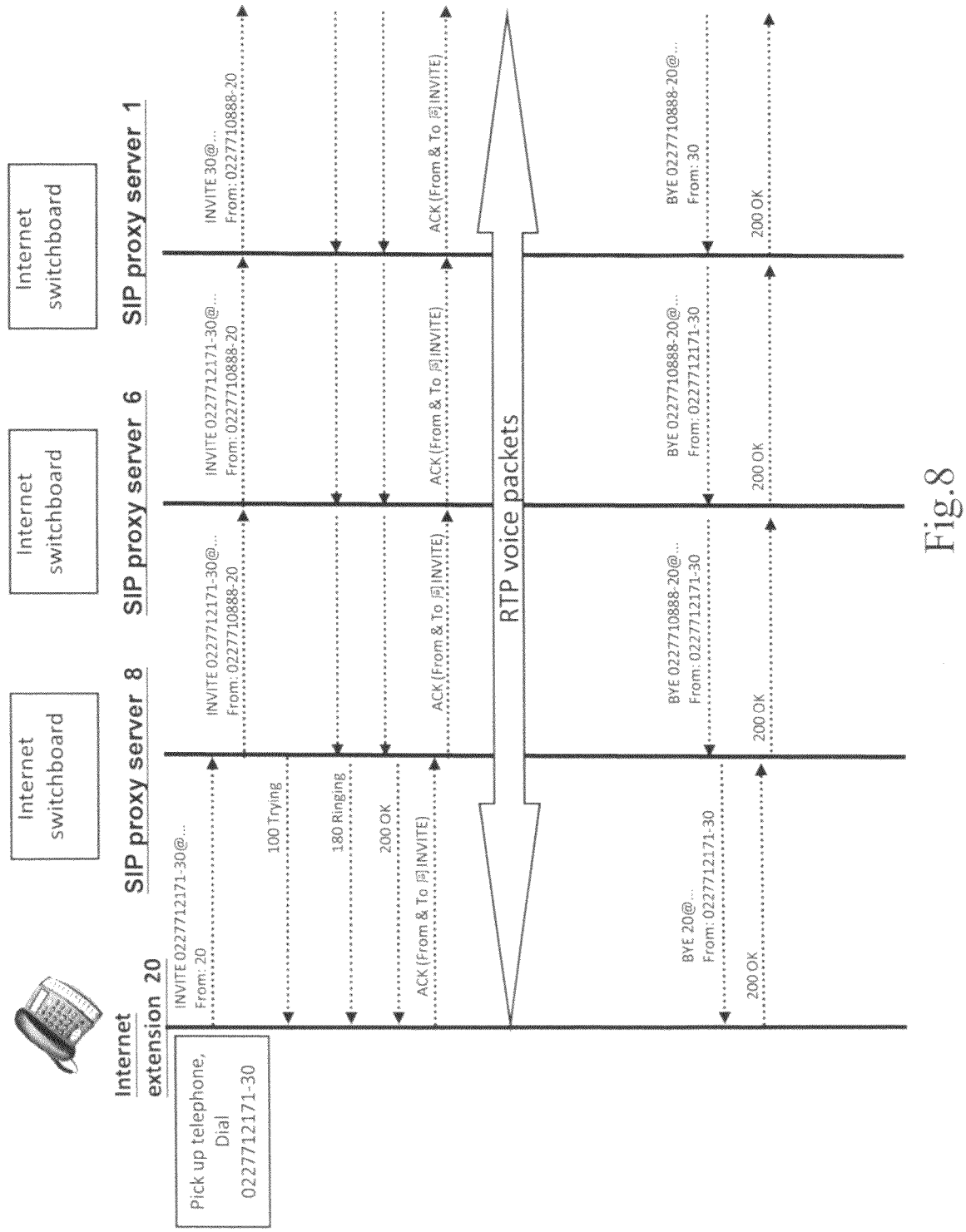
FIG. 8 and FIG. 9 are message flow charts for the system diagram in FIG. 7
Figure 9:
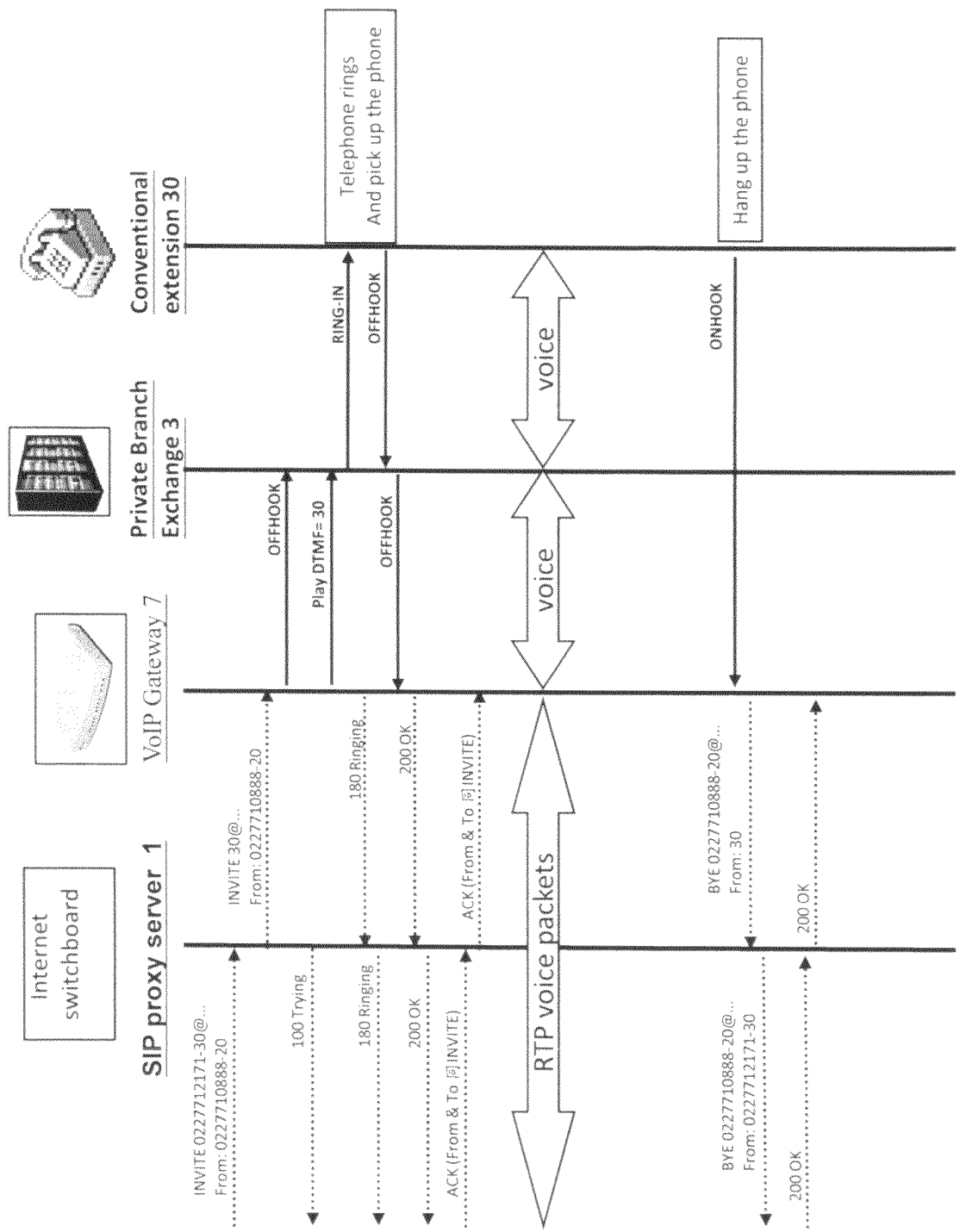

Dialing from Internet Extension of Other SIP Proxy Server to Conventional Extension Referring to FIG. 7, it is a system diagram for dialing from Internet extension 20 of other SIP proxy server 8 to conventional extension 30. The telephone number of the SIP proxy server 8 is 0227710888. A user picks up telephone at the Internet extension 20 for dialing the conventional extension 30 of the SIP proxy server 1 (with telephone number 0227712171). FIG. 8 and FIG. 9 show the flow charts thereof.

The user picks up telephone at the Internet extension 20 and dials 0227712171-30, it means that the user wants to dial the conventional extension 30 under the SIP proxy server 1 with telephone number 0227712171), so the Internet extension 20 issues INVITE message to the SIP proxy server 8. The SIP proxy server 8 knows that the dialing belongs to the SIP proxy server 1, so transmits the message packet to an upper SIP proxy server 6 of Taipei Education Bureau, and changes the parameter of "From" in the INVITE packet from "20" to "0227710888-20", it means that the call is from the Internet extension 20 under the switchboard telephone number 0227710888. SIP proxy server 6 determines a route by the telephone number and sends the packet to the SIP proxy server 1. After the SIP proxy server 1 receives the packet, it determines that the dialing is to the conventional extension 30, and changes the dialing number from "0227712171-30" to "30", and transmits to the VoIP gateway 7. Thereafter the flow chart is the same as that of dialing from Internet extension to conventional extension, the only difference is that the SIP proxy server 1 has to process the number 022771271 in receiving or transmitting packet. When the SIP proxy server 1 receives packet from the SIP proxy server 6, the "0227712171-" part of the dialing number has to be deleted and then sent to the VoIP gateway 7; when the SIP proxy server 1 receives packet from the VoIP gateway 7, the "0227712171-" has to be added into the dialing number.

The scope of the present invention depends upon the following claims, and is not limited by the above embodiments.

What is claimed is:

1. A system for dialing from internet extension to conventional extension comprising;
   an SIP Proxy server,
   an Internet extension,
   a Private Branch Exchange,
   a VoIP gateway and a conventional extension;
   wherein the SIP Proxy server, the Internet extension and the VoIP gateway are connected by Internet;
   wherein the Private Branch Exchange, the VoIP gateway and the conventional extension are connected by conventional telephone lines;
   wherein the VoIP Gateway has a telephone port and an Internet port, the telephone port has an FXO interface for being connected with an FXS interface of the Private Branch Exchange, and the Internet port connects with the SIP proxy server by Internet;
   wherein if the VoIP gateway has an FXS interface, the FXS interface is closed, an account number of an Internet telephone is set up for being registered in the SIP proxy server, and a route is set up from the Internet port to the FXO port so that a SIP message entered from the Internet port can be converted into SS7 message to be sent out through the telephone port; and
   wherein when the Internet extension dials the conventional extension, the Internet extension sends an Internet telephone message for passing through the SIP proxy server to the Internet port of the VoIP gateway,
   wherein when the SIP proxy server receives an INVITE message issued from the Internet extension; the dialing number is analyzed to see if it belongs to a conventional extension; if the dialing number does not belong to a conventional extension, then it is analyzed to see if it belongs to an Internet extension, if yes, then the SIP proxy server issues the INVITE message to the Internet extension, and finishes ringing, offhook, communication, onhook procedures, and then ends up the communication; if the dialing number is not a number of an Internet extension, then the SIP proxy server responds that there is no such extension, and ends up the communication; If the dialing number is a conventional extension number, then the SIP proxy server will issue INVITE message to the VoIP gateway;
   and then the VoIP gateway analyzes a dialing number for passing through the telephone port to the Private Branch Exchange and then to the conventional extension; the conventional extension returns with a conventional telephone message for passing through the Private Branch Exchange and then the telephone port, and then being converted into a corresponding Internet telephone message for sending through the Internet port and the SIP proxy server to the Internet extension; a voice packet received from the Internet port by the VoIP gateway will be converted into a voice signal for sending out through the telephone port to the Private Branch Exchange and then to the conventional extension; a voice signal received from the telephone port will be converted into a voice packet for sending out through the Internet port to the SIP proxy server and then to the Internet extension;
   such that when dialing from the internet extension to the conventional extension, it is not necessary to dial a telephone number of the Private Branch Exchange, a telephone number of the conventional extension is directly dialed from the Internet extension, and then pass through the SIP proxy server, the VoIP gateway, the Private Branch Exchange to the conventional extension, without requiring voice guidance.

2. The system according to claim 1, wherein the VoIP gateway can be replaced by an IP auto attendants.

3. The system according to claim 2, wherein the IP auto attendant is a computer-telephone integration system comprised of a computer, a network interface controller and a telephone voice card, and an application program is designed so that when the Internet extension dials the conventional extension, the IP auto attendant receives Internet telephone messages sent from the Internet extension through the SIP proxy server by the Network interface controller, analyzes the dialing number from an Internet packet, and then sends message by the telephone voice card to the conventional extension through the Private Branch Exchange; when the telephone voice card receives a conventional telephone message returned from the conventional extension through the Private Branch Exchange, the conventional telephone message will be converted into a corresponding Internet telephone message and sent to the Internet extension through the SIP proxy server by the Network interface controller; a voice packet received from the Network interface controller will be converted into a voice signal for transmission through the telephone voice card, while a voice signal received from the telephone voice card will be converted into a voice packet for transmission through the Network interface controller.

* * * * *